United States Patent
Matheny

(10) Patent No.: US 7,380,095 B2
(45) Date of Patent: May 27, 2008

(54) SYSTEM AND METHOD FOR SIMULATING REAL-MODE MEMORY ACCESS WITH ACCESS TO EXTENDED MEMORY

(75) Inventor: David L. Matheny, Cedar Park, TX (US)

(73) Assignee: Intel Corporation, Santa Clara, CA (US)

(*) Notice: Subject to any disclaimer, the term of this patent is extended or adjusted under 35 U.S.C. 154(b) by 381 days.

(21) Appl. No.: 10/882,483

(22) Filed: Jun. 30, 2004

(65) Prior Publication Data

US 2006/0004982 A1    Jan. 5, 2006

(51) Int. Cl.
*G06F 12/08* (2006.01)
(52) U.S. Cl. .................. 711/202; 711/2; 711/207
(58) Field of Classification Search ............. 711/202, 711/207
See application file for complete search history.

(56) References Cited

U.S. PATENT DOCUMENTS

| 5,125,087 A | 6/1992 | Randell |
| 5,237,669 A | 8/1993 | Spear et al. |
| 5,255,379 A | 10/1993 | Melo |
| 5,642,491 A | 6/1997 | Rose et al. |
| 6,324,644 B1 * | 11/2001 | Rakavy et al. ........... 713/1 |
| 6,996,706 B1 * | 2/2006 | Madden et al. ........... 713/2 |

OTHER PUBLICATIONS

European Patent Office, International Search Report and Written Opinion for International Application No. PCT/US2005/021113, 16 pages, Nov. 4, 2005.
Jean Gareau, "Embedded x86 Programming: Protected Mode," Embedded Systems Programming, Apr. 1998, pp. 80-93.
Intel Corporation, "Intel Architecture Software Developer's Manual—vol. 3: System Programming Guide," pp. 2-1 to 2-7 (sections 2.1 to 2.2), pp. 3-15 to 3-17 (section 3.5.1), p. 4-6 (section 4.4.1), pp. 5-9 to 5-19 (sections 5.8 to 5.12), pp. 5-38, pp. 8-9 to 8-16 (sections 8.6 to 8.9), and pp. 15-1 to 15-8 (section 15.1), 1997.

* cited by examiner

*Primary Examiner*—Reba I. Elmore
(74) *Attorney, Agent, or Firm*—Joni D. Stutman-Horn

(57) ABSTRACT

In some embodiments, the invention involves a system and method relating to switching to protected mode to access extended memory while executing instruction code that is designed for real mode memory access. In at least one embodiment, the present invention is intended to enable complex option-ROM code to be executed during pre-boot without corrupting system memory used by the BIOS or other option-ROMs. Other embodiments are described and claimed.

27 Claims, 6 Drawing Sheets

SYSTEM AND METHOD FOR SIMULATING REAL-MODE MEMORY ACCESS WITH ACCESS TO EXTENDED MEMORY

FIELD OF THE INVENTION

An embodiment of the present invention relates generally to computing systems and, more specifically, to accessing extended memory during protected mode execution while simulating real mode memory accesses.

BACKGROUND INFORMATION

Even though computers have been shipping with several megabytes of random access memory (RAM) for years now, the total memory available for pre-boot add-in devices is still limited to a mere 1 MB of memory when operating in real mode. This 1 MB limit becomes a burden during pre-boot because there is no standard method for allocating memory from the 640K base memory area. In many cases, the memory allocated by one program will be overwritten by another program because the program either is not aware of the memory allocation method being used or the program has a bug. Nothing prevents one program from overwriting the data of another program in memory because there is no protection scheme during pre-boot. Every program has access to all of the available memory in real mode. Some of the programs competing for the memory are device-specific option-ROMs, the basic input/output system (BIOS), and the operating system (OS) boot loader. There are ways to get past the 1 MB boundary in order to use extended memory, but this typically requires significant changes to a program that was previously written to run in real mode.

When a computer system starts up, the BIOS takes control and the processor executes in real mode. Real mode is typically a 16-bit mode for the processor, but 20-bit addresses can be accessed because of segment addresses. 16-bit mode implies being able to access 16-bit addresses. Segment addressing gives access to 1 MB of memory as opposed to only 64K of memory which would be accessible using only 16-bit addresses with no segments. 1 MB is the total memory space available in real mode. Traditionally the lower 640K of memory is available to applications in real mode. Extended memory, or memory above 1 MB, is not available in real mode.

Referring now to FIG. 1, there is shown a method for using 20-bit segment addresses and offsets to access 1 MB of memory in real mode. The segment register 101 is 16-bits. The offset register 103 is also 16-bits. These registers are combined by shifting the segment register left 4-bits so it is now a 20-bit number 105. The offset register 103 is added to this segment address 105 to generate a 20-bit segment+offset memory reference 107.

A simple way to understand this addressing scheme is to imagine that the segment register 105 always has 4 additional bits on the low order end 109 that cannot be changed. Therefore, the segment register is actually 20 bits, but only 16 are visible outside of the processor. The 16-bit offset 103 is added as follows, according to the example values in FIG. 1. The actual 20-bit Segment Register is 1001 1101 1111 0000 0000 where the bolded bits 0-3 are not visible outside of the processor. The segment register and offset are added as below to generate the physical address in the 1 MB range.

| | |
|---|---|
| Visible Segment Register: | 1001 1101 1111 0000 (9DF0h) |
| Real Offset: + | 0000 0100 0000 0000 (400h) |
| Physical (or linear) address = | 1001 1110 0011 0000 0000 (9E300h, also written as 9DF0:0400) |

A new potential segment starts every 16 bytes in memory. Each segment is 64K long. Thus, segments may overlap each other, i.e., offsets added to a segment address may span more than one segment. There may be over 4000 combinations of segment+offset combinations that will result in an actual address in memory. In other words, each physical address may be within more than one segment.

FIG. 2 illustrates the overlap of 16K segment addresses with segment addresses and 64K offsets. For instance, segment address 0 (201), segment address 1 (203) and segment address 2 (205) are shown. Adding an offset of up to 64K to segment address 0, for example, references memory 207 that overlaps memory referenced using segment address 2 (209). This addressing scheme is well known in the art.

Protected mode enables programs to access more than 1 MB of memory. The processor may switch to protected mode at anytime. The executing software initiates a switch to protected mode. The executing software may also switch back to real mode. This switch to protected mode typically is executed by the boot loader upon loading the operating system (OS) so that all of memory is available to the OS. During protected mode, extended memory can be addressed using a selector and offset combination.

There is a need in the industry to enable pre-boot applications, such as those found on device-specific option-ROMs, to use extended memory in lieu of the lower 1 MB of memory when memory requirements of the application are high. There is also a need for pre-boot applications which have been designed to run in real mode to execute in protected mode without being rewritten.

BRIEF DESCRIPTION OF THE DRAWINGS

The features and advantages of the present invention will become apparent from the following detailed description of the present invention in which.

DETAILED DESCRIPTION

An embodiment of the present invention is a system and method relating to switching to protected mode to access extended memory while executing instruction code that is designed for real mode memory access. In at least one embodiment, the present invention is intended to enable complex option-ROM code to be executed during pre-boot without corrupting system memory used by the BIOS or other option-ROMs.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

An embodiment of the method described herein maps extended memory over memory in the base memory area. This will allow existing option-ROMs to use more base memory without colliding with usage of the base memory of other programs, or having their own memory overwritten by other programs. This technique is especially useful for option-ROMs that require a large amount of data storage that must be maintained throughout the pre-boot phase.

An embodiment of the disclosed method allocates extended memory for data storage to a pre-boot application, where the pre-boot application is designed to operate in real mode. The processor may be switched to protected mode. The real mode memory address referenced by the pre-boot application may be translated to an extended memory address reference, and the pre-boot application instruction may be executed using the translated extended memory address instead of the real mode memory address.

An embodiment of the method described herein involves switching the processor periodically to protected mode from real mode during pre-boot. In order to eliminate programming changes to existing option-ROMs, protected mode selectors may be used with the limit set to less than or equal to 64 KB and the base set to the extended memory address that is available. This eliminates the need to interface with gate A20. Gate A20 controls the 1 MB address wrap-around feature and affects other pre-boot systems such as the POST Memory Manager (PMM), as discussed below.

Figure 1:
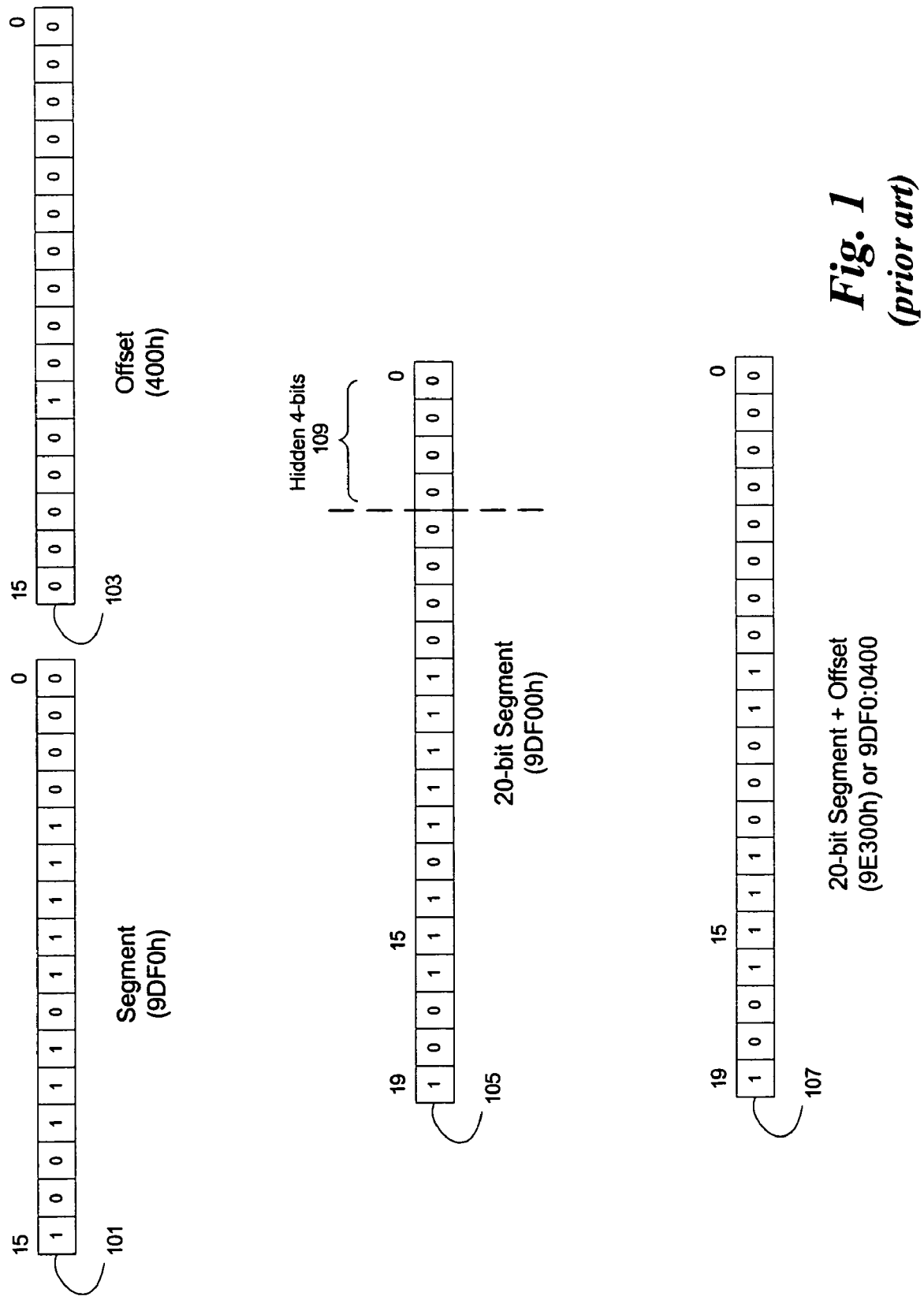
FIG. 1 is a block diagram illustrating real mode memory addressing using segments and offsets.
Figure 2:
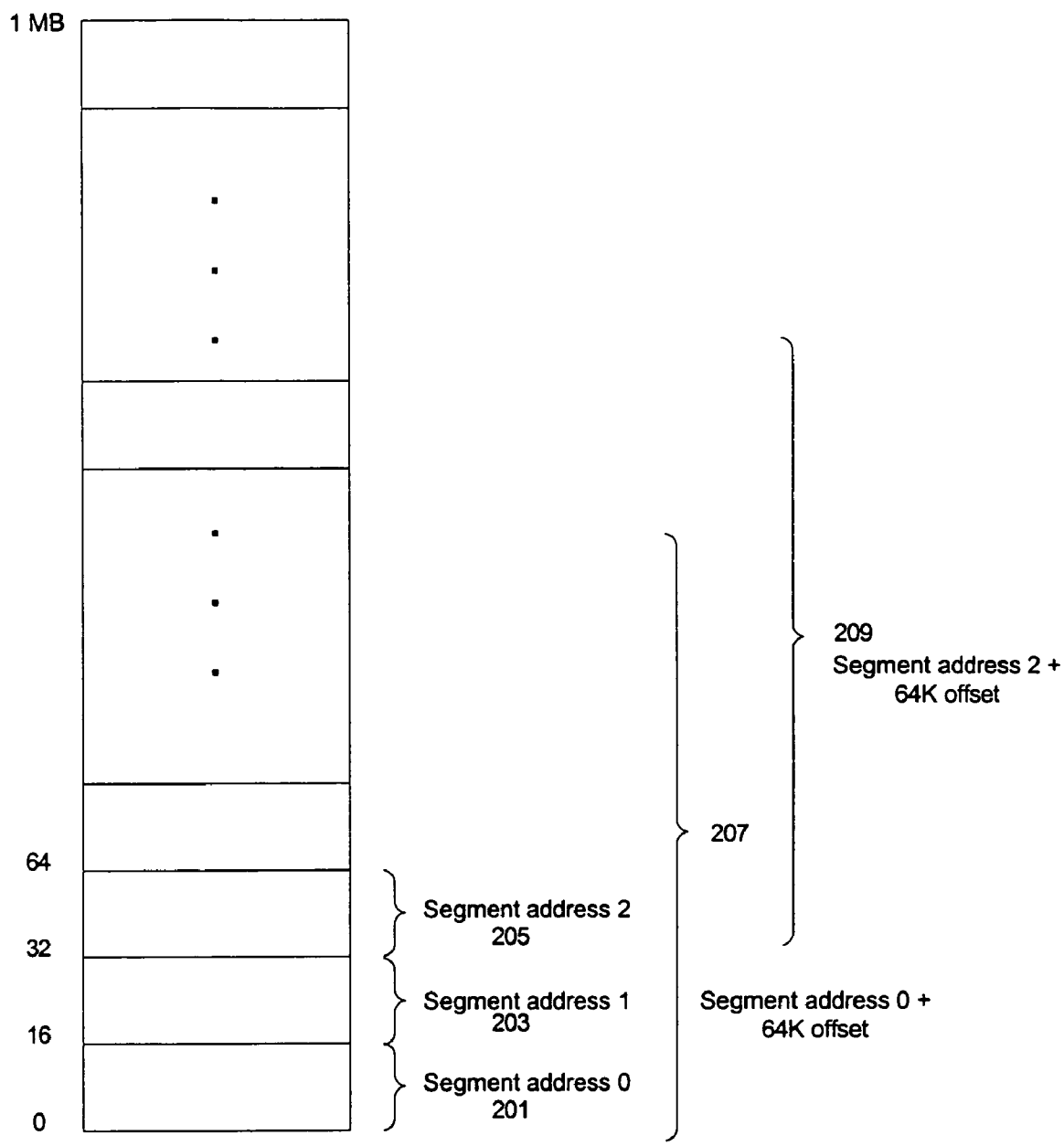
FIG. 2 is a block diagram illustrating that segment addresses may overlap in memory.
Figure 3:
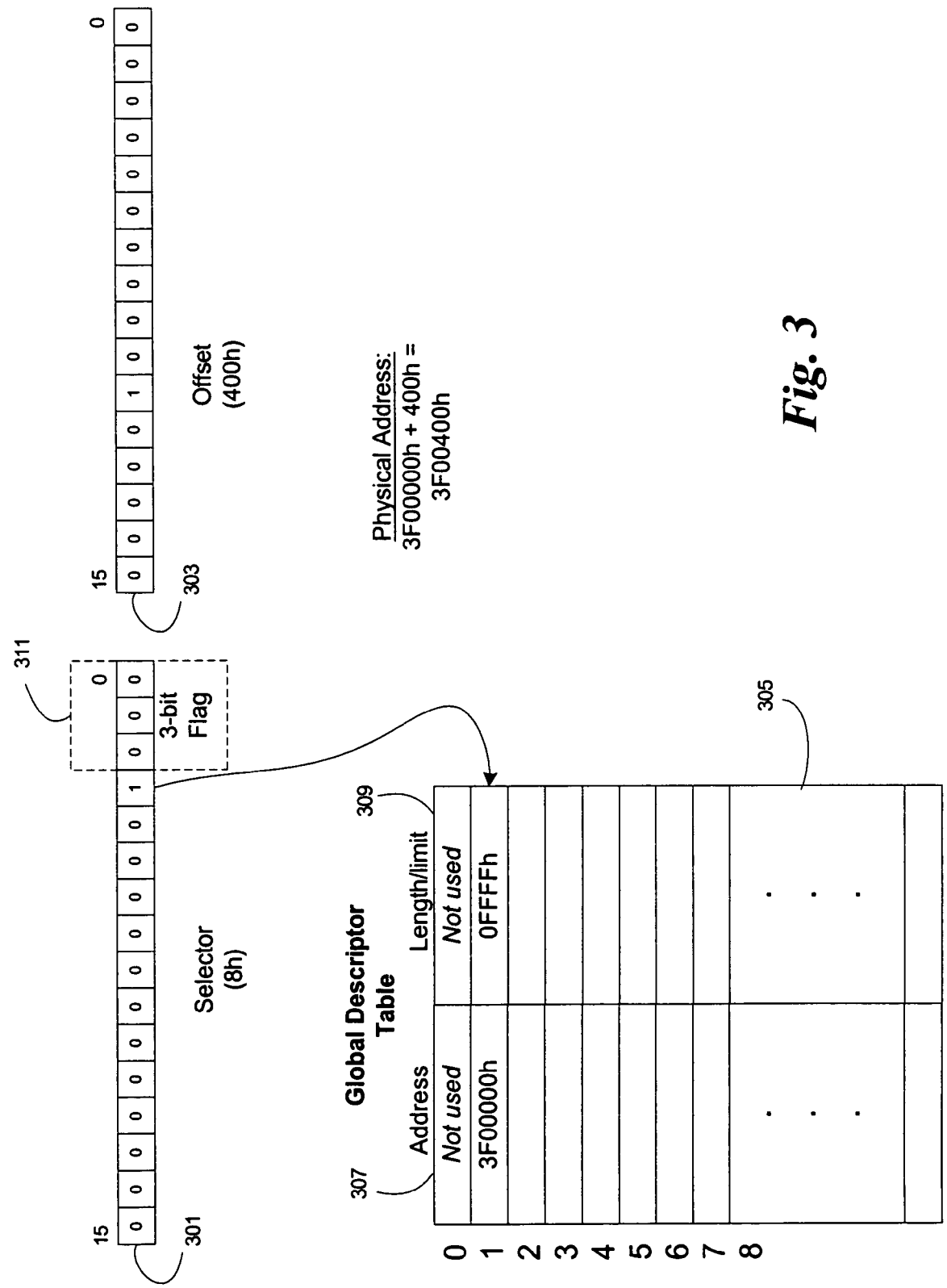
FIG. 3 is block diagram showing an embodiment of protected mode memory addressing using selector registers, offsets and descriptor tables.

Referring to FIG. 3, there is shown a virtual memory scheme used to access memory in protected mode. In protected mode, addressing uses a 16-bit selector 301 and an offset 303. A selector is different from the segment value used in real mode because a selector is not an address, but an index into a descriptor table such as the Global Descriptor Table (GDT) 305. Each descriptor in the GDT contains a linear base address 307 and a limit 309 for that selector. The GDT itself is typically limited to 64 KB and each entry is 8 bytes which leaves room for a total of 8192 descriptors. Each descriptor is 8 bytes long, and the bottom 3 bits of a selector 311 are used as flags. As an example, if the selector is set to 8h and the offset is 400h then the second descriptor in the GDT is used. The first location in the descriptor table at the zero location is not used. In this example, the second descriptor contains a base address of 3F00000h and a limit of 0FFFFh (64K segment). Since the offset 400h is less than the limit, the offset is added directly to the base address to form a linear address as such: 3F00000h+400h=3F00400h. Other methods may be used if boundaries less than 16 bytes must be addressed, since there is no provision for using the bottom 3 bits of the selector, as further described below.

An embodiment of the present invention uses protected mode selectors as pseudo real-mode segment addresses. This method requires a switch to protected mode. A 64 KB GDT may be allocated and either initialized to zero or initialized with every descriptor referencing the correct linear address. It is preferable for each descriptor to have a limit of 0FFFFh (64 KB) to make sure real-mode acts as it normally does. In one example, the entire GDT may be initialized to zero. After initializing the table, the extended memory addresses may be mapped into a pseudo-real-mode address by replacing the desired selector. For example, in order to map address 3F00000h over segment address 9DF0h, the selector at offset 9DF0h from the beginning of the GDT may be configured with base address 3F00000h and limit 0FFFFh. Once this is done, real mode programs that access segment 9DF0h will actually be accessing the extended memory address 3F00000h. This translation is transparent to the executing option-ROM.

When the GDT is initialized to zero, the descriptors are all initially null. If a program attempts to access a null descriptor in the GDT, then a general protection fault (GPF) occurs. This fault may be trapped while in protected mode by installing an Interrupt Descriptor Table (IDT) and installing a GPF handler in the IDT. The return address on the stack when a GPF handler is called is the address of the offending instruction. In this way, the offending instruction may be re-executed upon returning from the GPF handler after the original problem is corrected. If the descriptor is initialized to the linear address, or has already been filled in with the linear address, then the instruction may execute immediately, without causing a GPF, by using the address referenced in the descriptor.

A GPF handler may be installed to handle the errors that occur when one of the null descriptors gets used. This handler may fill in the descriptor that was used and then re-execute the instruction. For example, if the segment register contains 40h which should point to the BIOS Data Area (BDA), then the descriptor at offset 40h from the beginning of the GDT should be filled in with base address 400h and a limit of 0FFFFh. With segment addressing, the address is shifted left 4 bits and the lowest 4 bits are not used as part of the address. When the instruction is re-executed after the GPF handler finishes, the program will be accessing the real BDA directly. If the memory access occurs in the range that has been re-mapped, the base address should point to the appropriate offset in extended memory and the limit can be shrunk so the program cannot access past the end of the allocated extended memory.

There are other additional problems that must be addressed in order for this method to work. First, selectors may only access 8192 entries in the GDT because only the most significant 13 bits are used as an index. In one embodiment, the first 3-bits in a selector (311) are protection flags for memory and are always zero. For other applications, this flag is used to indicate whether memory is read-only or read/write, etc. Thus, there are no valid selectors for any address ending with a 1-7, since the lowest 3 bits must be 0. For instance, 9DF1h through 9DF7h cannot be represented using this 13-bit selector. In real mode, all segment addresses are valid since the segment address is shifted left 4 bits before being used. Thus, there are actually 16 bytes between segment address 9DF0h and 9DF1h, but 9DF1h is a valid address. Second, the first descriptor, which is referenced by selector 0, must always be null. This may cause a problem because the real mode interrupt vector table (IVT) typically resides at address 0000:0000 and requires a zero selector reference. Possible solutions to these problems are described in exemplary embodiments, below.

In one embodiment, a range of descriptors is designated from the GDT that are known to never be used by the option-ROM or any dependent drivers. For instance, if this method is applied to only one option-ROM, then an unused address range can be reserved, such as 3000:0 to 3FFF:0. Another embodiment sets up another descriptor table called a Local Descriptor Table (LDT) to represent those segment addresses that are not divisible by 8. In either case, the installed GPF handler must replace the value in the invalid segment register with a descriptor that represents the memory that needs to be addressed. Other methods may be used to trap the odd segment addresses as long as the GPF handler appropriately associates the correct physical memory location with the instruction being executed. It will be readily apparent to one of ordinary skill in the art that various methods may be used to translate these odd addresses and the methods are implementation dependent.

In an embodiment, when an entry-point to the option-ROM is called, for instance through a call to an interrupt service routine (ISR), the processor is switched to protected mode and the GDT and optional LDT which have been discussed above are installed. Before the option-ROM exits, the processor is restored to its previous state, including restoration of any previously installed descriptor tables.

Figure 4:
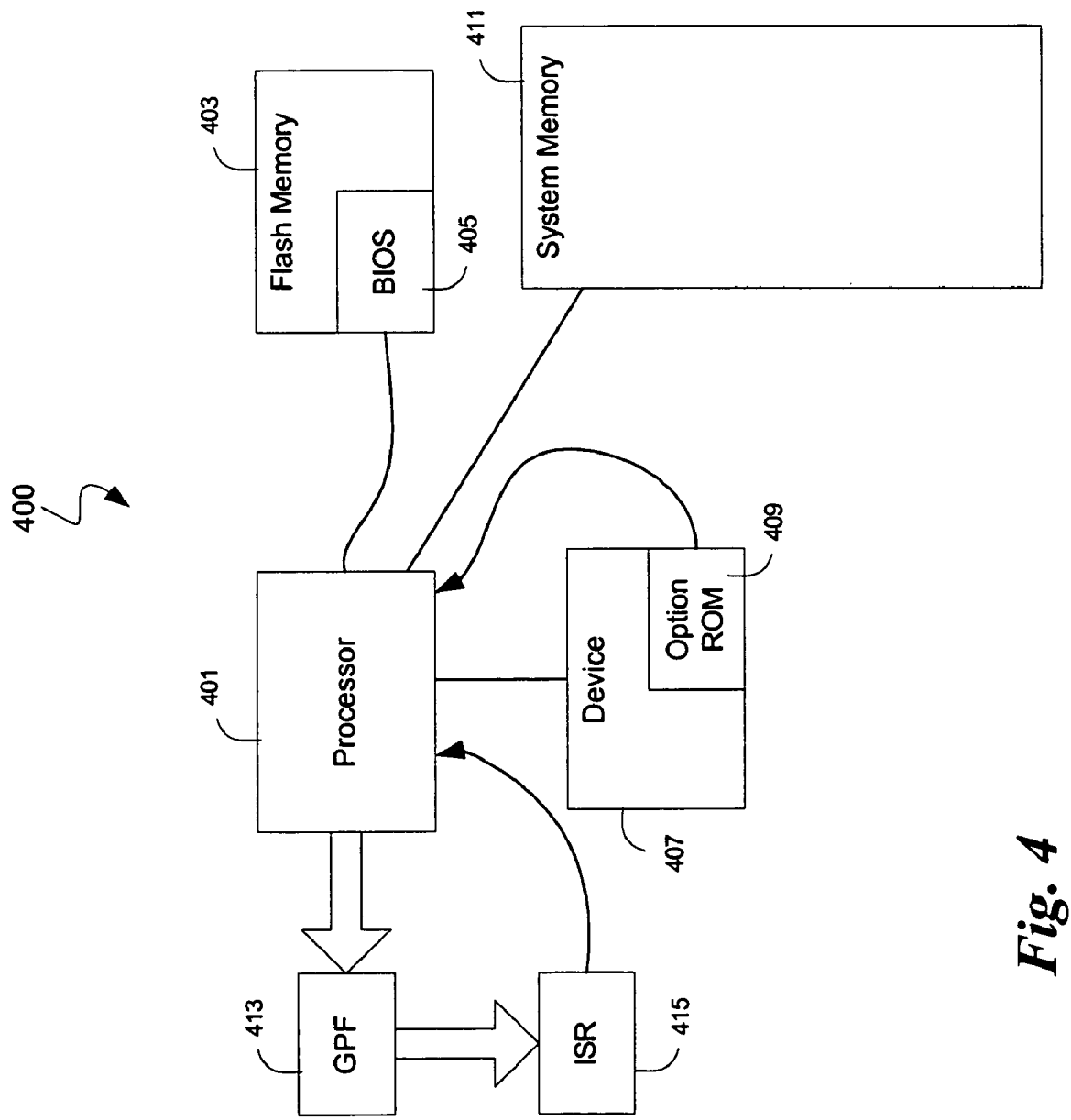
FIG. 4 is a block diagram showing an exemplary embodiment of a system using protected mode memory addressing for applications expecting real mode addressing.

Referring now to FIG. 4, there is shown an exemplary system which enables extended memory to be accessed by code that is designed for real mode memory access. A processor 401 is operatively connected to a non-volatile memory 403 having a basic input/output system (BIOS) 405 for booting the system 400. An add-in device 407 is communicatively coupled with the processor 401 and may have an option-ROM 409 for initializing an add-in device 407. The BIOS 405 scans the system 400 during pre-boot and loads and executes the device option-ROM code 409. The processor is connected to system memory 411. During real mode, only 1 MB of the system memory 411 may be accessed. The processor may experience a general protection fault (GPF) 413 which initiates an interrupt service routine (ISR) 415. In embodiments, the ISR 415 handles memory access during protected mode to simulate access of real mode memory as further discussed herein.

Figure 5:
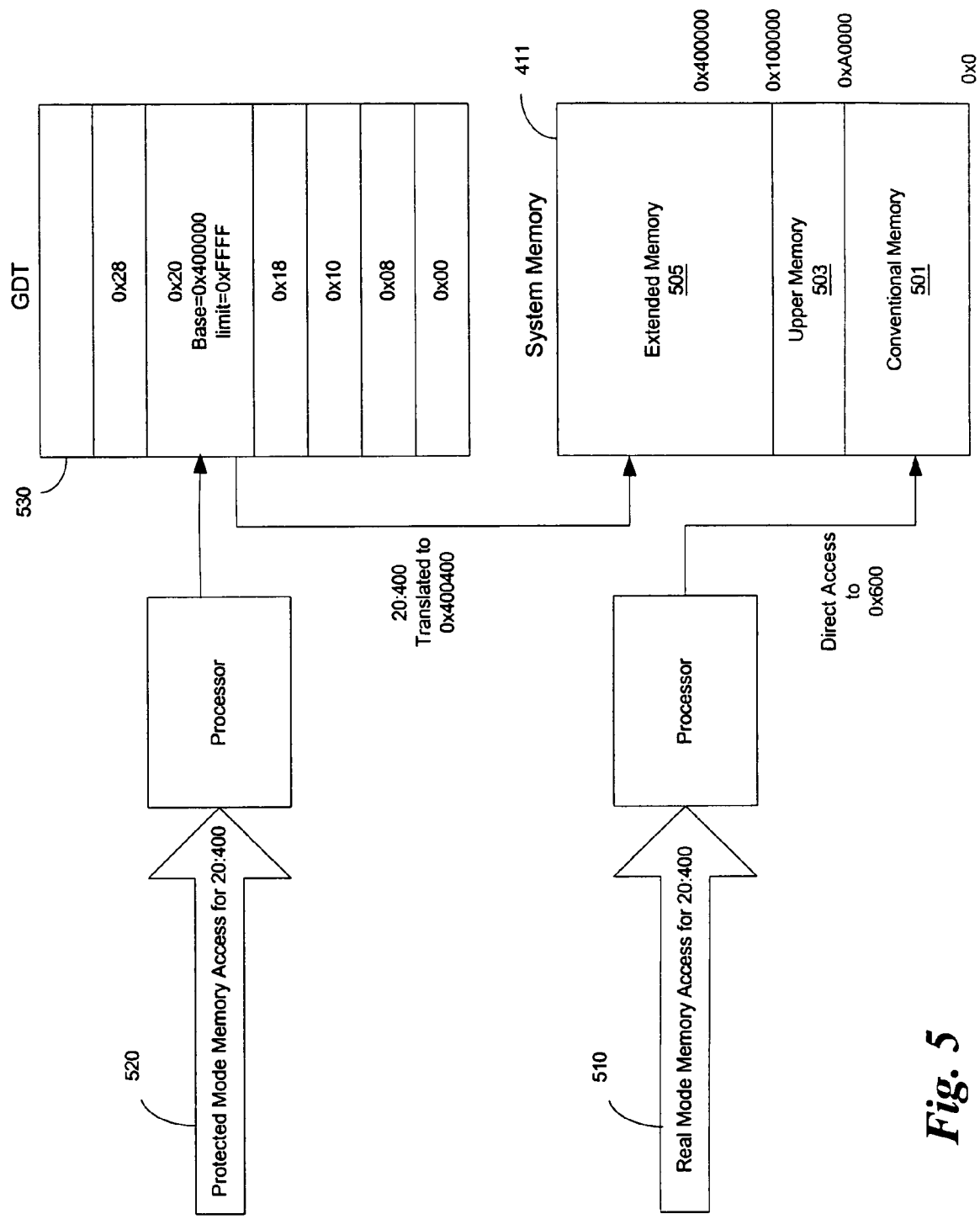
FIG. 5 is a block diagram illustrating differences in accessing lower 1 MB and extended memory using both real and protected mode addressing.

FIG. 5 further illustrates the differences in access to system memory 411 during real and protected modes. System memory 411 comprises 640K of conventional memory 501 and upper memory 503. In existing systems, conventional memory 501 and upper memory 503 combined comprise 1 MB of memory. Extended memory 505 may exist in various amounts. Real mode memory access 510 enables an instruction to access conventional and upper memory. Protected mode access 520 enables the instruction to additionally access extended memory using a GDT 530, i.e., virtual memory. The virtual address used in protected mode uses the GDT to access extended memory 505 by translating the base address in the GDT.

In an embodiment, a process, such as instructions stored in an option-ROM, is designed for real mode, e.g., limited to 1 MB. When loading the instructions, the BIOS allocates 1 MB of extended memory for executing the option-ROM. The processor switches to protected mode and the option-ROM real mode addressing may be translated to protected mode extended memory addresses using GPFs, ISRs and descriptor tables. This method may give an option-ROM the illusion of having access to the entire 1 MB real mode address space without causing conflicts with other loaded option-ROMs or the system BIOS. In this way, existing real mode programs may use more memory without having to be re-written to explicitly access extended memory.

Embodiments of the present invention may be used to reduce the amount of conventional memory that is used by a program. Embodiments of the present invention may also allow a program shrink its upper memory block (UMB) code image. This enables more option-ROMs be loaded by the system BIOS.

In existing systems, there are two types of option-ROMs: (1) boot connection vector (BCV) devices (i.e., for devices like a small computer system interface (SCSI) card) that typically use int13 interrupt for disk access, and (2) boot entry vector (BEV) devices. The BCV devices must be present in memory from the beginning of power-on self test (POST), because they may contain boot instructions. These devices do not typically use much memory.

The BEV devices are typically pre-boot execution environment (PXE) devices which do not need to be present throughout the entire pre-boot process, but are available to boot the system. The BIOS will not attempt to start these PXE devices until the BIOS and all other ROMs have finished using real mode memory. PXE devices may use a great deal of memory. However, since they are not started until other devices have completed their need for memory, there is no worry that other pre-boot applications will corrupt the memory needed by the PXE device.

Internet SCSI (iSCSI) is a serialization of the SCSI protocol to operate over the Internet or Internet protocol (IP) network. iSCSI enables the processor to run from a remote disk on some other computer across the network, as if the processor were local. An iSCSI drive appears to be just another drive on the system. An iSCSI boot device must be present throughout the entire pre-boot execution, and has the same memory requirements as a PXE device. Thus, it presents a challenge when executing other option-ROMs or instructions that require a portion of real memory during pre-boot. Existing systems do not have an adequate memory management system to accommodate a device with high memory requirements which prevents memory from being overwritten by another module or device. Thus, existing iSCSI devices cannot be used as boot devices.

For iSCSI, many buffers are required to get network traffic to work, so more memory is required. If buffers are allocated in real mode, they take up so much memory that when the BIOS takes control again the buffers will be overwritten by the BIOS. Future remote IDE protocol may experience the same problems as iSCSI. Also, other remote boot protocols may experience these problems. Embodiments of the present invention enable iSCSI devices to be boot devices and may accommodate future remote IDE protocols.

An advantage of an embodiment of the disclosed method is that Gate A20 is not affected. Gate A20 controls the 1 MB address wrap-around feature. Real mode addressing wraps around from the bottom when addresses over 1 MB are referenced when the wrap-around feature is enabled. To access extended memory, this feature needs to be disabled. Turning off this feature may corrupt the POST memory manager (PMM) which is available on many current systems. The PMM allows memory above 1 MB to be accessed in an organized manner. If PMM is operating on the platform, one should not directly change the A20 settings. Even though an embodiment of this invention may access addresses above 1 MB in protected mode, the selector limits in the GDT may be set at 64 KB or less so the A20 wrap-around is never used. The virtual address will not be over 1 MB, but the physical address may be. In an embodiment, the gate A20 affects only the virtual address. Once the virtual address is decoded using the GDT, it may be above 1 MB. Gate A20 is typically only used in Real mode, but because this technique is used during pre-boot, the gate may be set or unset for other processes.

Figure 6:
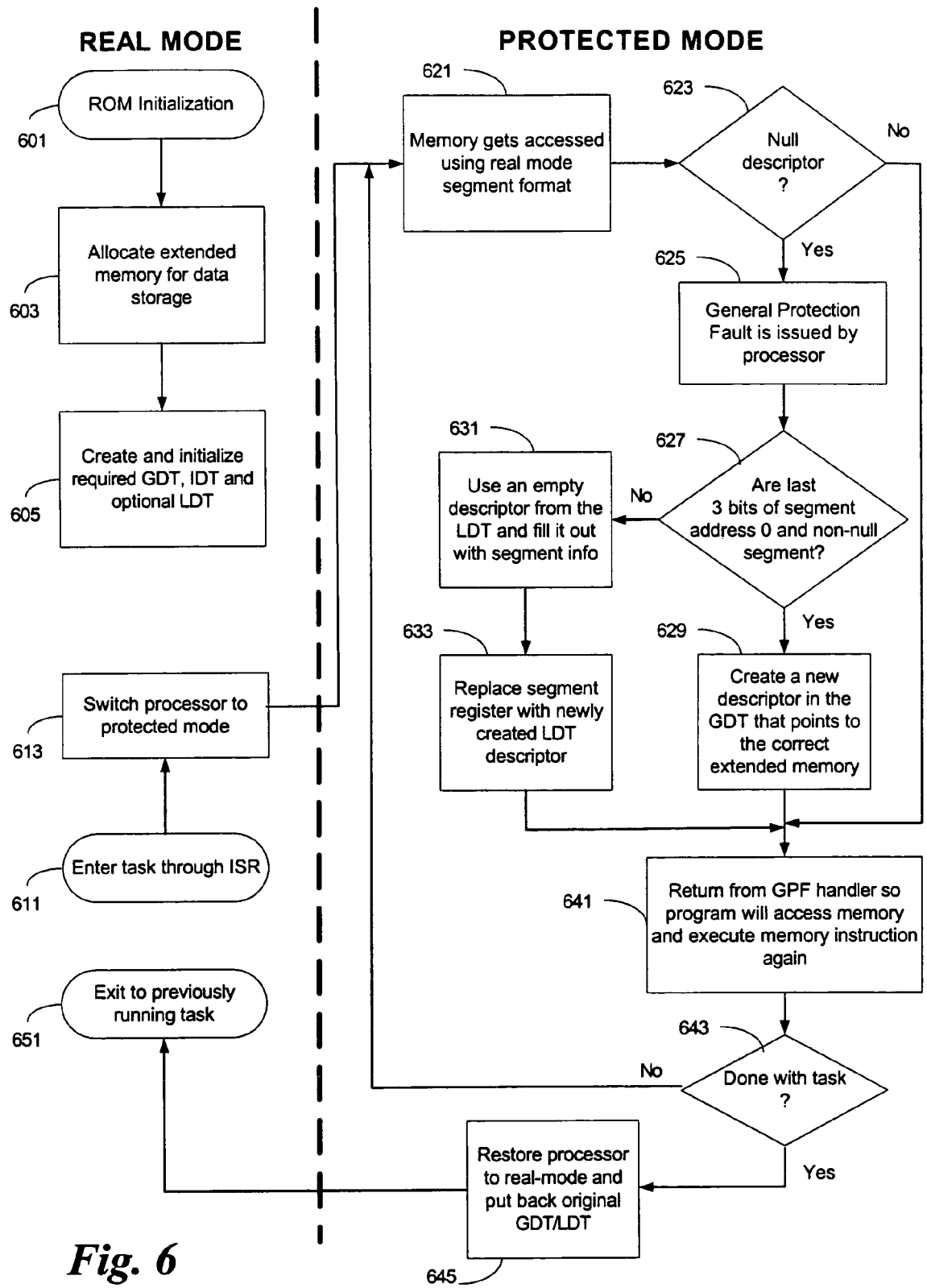
FIG. 6 is a flow diagram illustrating an embodiment of the method described herein for using protected mode to enable pre-boot applications to use extended memory.

Referring now to FIG. 6, there is shown a flow diagram illustrating an embodiment of a method for enabling applications written for real mode to access extended memory transparently in protected mode. When the processor is booted, it proceeds with ROM initialization in block 601. The BIOS scans the devices and executes option-ROMs from the devices when necessary.

Before executing the option-ROMs, the BIOS may allocate extended memory for data storage for each option-ROM in block 603. It may be preferable to allocate the full 1 MB for each option-ROM so that it appears that all of real memory is allocated to the option-ROM execution. Each option-ROM may be allocated unique portions of extended memory so that there is no possibility that one option-ROM can corrupt the memory area of another option-ROM. If a POST memory manager (PMM) is available, then PMM may be used to allocate the memory. If not, other methods of allocation may be used.

In one embodiment, global description tables (GDTs), an interrupt descriptor table (IDT), and optional local descriptor tables (LDTs) are created and initialized in block 605. Processor instructions are used to install the tables. Installing the GDTs is equivalent to making it known to the processor where the tables reside. When necessary, the processor looks up the virtual addresses in the GDT and then performs the translations. The interrupt service routines (ISRs) for handling general protection faults (GPFs) due to accessing null descriptors, etc. are loaded into the IDT and associated with the appropriate GPF handler. When the processor is actually running in real mode, there will be no GPF, and the ISR will not run. The currently executing option-ROM is to be associated with the current GDT. Only one extra GDT may be required for this process. There may be a stack of GDTs associated with various option-ROMs and pre-boot instructions, but no special handling is involved.

When the processor runs option-ROM instructions, or other pre-boot instructions that are set up to use the disclosed method, a GPF may be generated before instructions requiring memory access may be performed. An interrupt service routine (ISR) may be executed to handle the memory access so that extended memory is used instead of the lower 1 MB in block 611. If the descriptor has already been filled in, i.e., this memory address has already been translated, then the instruction may execute without causing a GPF. In an example, the instruction pointer may reference a move instruction, i.e., move some data into memory A(x), which requires a memory access to real mode memory address A(x). The memory location referenced by the instruction will be mapped to extended memory by an embodiment of the disclosed method. The memory access itself causes the exception, or fault, and initiates the fault handler, or interrupt service routine. The ISR switches the processor to protected mode, but keeps track of which mode it was in before the switch, in block 613.

Once in protected mode, memory is accessed using selector and offset methods, but the instructions are using real mode segment format in block 621. The memory references must be translated by the processor before actual memory is accessed. The fault handler determines whether the memory can be mapped using the GDT. If not, then the data segment (DS) is changed to be an index into the LDT. The ISR still knows which physical address is referenced.

The option-ROM environment does not change. The option-ROMs operates on real mode segment addresses. If the segment address has not been set up yet in the GDT when the option-ROM code attempts an access, then the descriptor is null. The processor uses the segment address as a selector into a GDT. The processor then determines whether the referenced descriptor is null, in block 623. If the descriptor is null, then a GPF is issued by the processor in block 625. The ISR associated with this GPF maps the selector used by the option-ROM code to a different physical address in extended memory and then attempts to execute the instruction again. The ISR maps the segments and offsets into selectors and offsets for accessing extended memory via the GDT.

A local descriptor table (LDT) may be used to fill in the gaps in addressing, due to the lower 3 bits being zero, if a GPF occurs, but the GDT cannot be used. Instead, the LDT may be used to map a new selector to the virtual memory and then re-execute the instruction using the appropriate selector/offset combination. One of ordinary skill in the art will appreciate that other methods may be used to map segments that are not addressable using the GDT scheme. The LDT may work the same way as the GDT, i.e., it has a descriptor with a base address and a limit. The LDT may not often be used because memory is typically referenced in chunks on boundaries that are accommodated by the GDT. If necessary, a descriptor may be set up in the LDT with the referenced physical address into the LDT and the DS is changed to be an index into the LDT.

To determine whether a LDT is necessary, a determination is made as to whether the last 3 bits of the segment address are zero and it is a non-null segment in block 627. If the last 3 bits are zero, then the GDT may be used and a new descriptor is created in the GDT to point to the correct location in extended memory for that segment address, in block 629.

If the last 3 bits of the segment address are non-zero, then an alternate method must be used to translate the address to extended memory in blocks 631 and 633. In one embodiment, an empty descriptor from the LDT is used to fill in with the segment information in block 631. The segment register may then be replaced with the newly created LDT descriptor in block 633.

In one embodiment, the LDT has one valid descriptor. The first element in the LDT may be used. The descriptor is set up and the address is accessed. The segment address is changed to be the pointer into the LDT. When a GDT is used, the segment need not be changed. In one example, the segment is changed to be 8. The LDT may be the same size as the GDT. Descriptor 1 is the first usable descriptor in the LDT. This descriptor is set up to reference the memory intended to be accessed in real mode. The segment address is replaced with the new descriptor in the LDT. The processor then exits from the fault handler and re-executes the single instruction in block 641. A processor trap may be used to execute a single instruction. The segment address may then be replaced with the original address for future use. It is determined whether the task is complete in block 643. If so, the processor is restored to its previous mode and the original descriptor tables (GDT/LDT) are restored in block 645. In one embodiment, each process has a unique GDT/LDT and they are stored in a stack or other data structure to ensure that the appropriate tables are used. Execution continues where it left off in block 651. However, if the task is not complete, i.e., additional memory accesses are required, then processing continues with block 621.

In another embodiment, the LDT may be pre-loaded with a hash table and then the LDT operates the same as the GDT. When an address is referenced, if there is an exception, a descriptor is allocated in the LDT the same as with the GDT and then returns and lets the ISR access the memory through the LDT as normal. This method has the disadvantage of using more memory because each segment must have a hash location that is not reused. Thus, the full 64K must be allocated for the table. Since each option-ROM needs to allocate its own LDT, this method may be undesirable.

In another embodiment, the processor and BIOS are also subject to this method, so that the BIOS code would execute in 1 MB of extended memory instead of the lower 1 MB. In an embodiment, the option-ROM initiates the change to protected mode. In another embodiment, the BIOS initiates the change to protected mode and uses the disclosed technique for accessing extended memory. The translation is transparent to the executing code.

Another complication is that the interrupt vector table (IVT) typically resides at 0000h. Descriptor location 0 is unavailable. However, the IVT is almost always accessed using a segment address of 0. In an embodiment, accessing this table is done by setting up a non-zero descriptor which maps to the zero address, accessing the table, and then resetting the address for later use. The reason this is necessary is because the programs to be executed expect to be in real mode, but are executed in protected mode instead.

An example of where an embodiment of the disclosed invention may be desirable is to implement an Internet Small Computer System Interface (iSCSI) boot option-ROM. There are several large items that must be kept in memory for iSCSI boot to function, including: a network interface card (NIC) or local area network (LAN) on motherboard (LOM) driver to provide network access, and fully functional Transfer Control Protocol/Internet Protocol (TCP/IP) and iSCSI stacks for communicating with an iSCSI target. iSCSI boot presents a problem in existing systems because the memory must be allocated very early in the boot process and must remain available until the OS boot loader has executed the switch to a protected mode iSCSI initiator. Because the memory must be maintained for such a long period (by pre-boot standards), memory must be allocated that will not be used as scratch memory by other programs. Another problem exists simply because it is possible to use existing NIC/LOM drivers to provide network access, and it may not be possible to change these drivers to use extended memory. Embodiments of the disclosed method allow iSCSI and LOM drives to access extended memory without being rewritten.

The techniques described herein are not limited to any particular hardware or software configuration; they may find applicability in any computing, consumer electronics, or processing environment. The techniques may be implemented in hardware, software, or a combination of the two. The techniques may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, that may include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various system configurations, including multiprocessor systems, minicomputers, mainframe computers, independent consumer electronics devices, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by the machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method, comprising:
    allocating extended memory for data storage to a pre-boot application, the pre-boot application being designed to operate in real mode, wherein the pre-boot application comprises option-ROM code on an add-in device;
    switching the processor to protected mode;
    executing the pre-boot application in protected mode;
    translating a real mode memory address used by the pre-boot application into an extended memory address reference;
    executing a pre-boot application instruction using the translated extended memory address instead of the real mode memory address; and
    restoring the processor to a state held previous to switching to protected mode, wherein the state held previous is one of real mode and protected mode.

2. The method as recited in claim 1, wherein translating is performed by an interrupt service routine (ISR).

3. A method, comprising:
    allocating extended memory for data storage to a pre-boot application, the pre-boot application being designed to operate in real mode;
    switching the processor to protected mode;

translating a real mode memory address used by the pre-boot application into an extended memory address reference; and executing a pre-boot application instruction using the translated extended memory address instead of the real mode memory address, wherein allocating extended memory further comprises:
creating descriptor tables; and
initializing the descriptor tables.

4. The method as recited in claim 3, wherein the descriptor tables comprise at least one global descriptor table (GDT), at least one interrupt descriptor table (IDT), and at least one local descriptor table (LDT).

5. A method comprising:
allocating extended memory for data storage to a pre-boot application, the pre-boot application being designed to operate in real mode;
switching the processor to protected mode;
translating a real mode memory address used by the pre-boot application into an extended memory address reference, wherein translating is performed by an interrupt service routine (ISR);
executing a pre-boot application instruction using the translated extended memory address instead of the real mode memory address;
accessing memory using a real mode segment register;
issuing a general protection fault (GPF) if a null descriptor is referenced in a global descriptor table (GDT); and
creating a new descriptor in the GDT that points to a location in extended memory.

6. The method as recited in claim 5, further comprising:
using a local descriptor table (LDT) to translate addresses where flag bits of the segment register are non-zero; and
replacing the segment register with a newly created LDT descriptor.

7. A machine accessible storage medium having instructions stored thereon for translating real mode addressing to protected mode addressing, that when executed cause a machine to:
allocate extended memory for data storage to a pre-boot application, the pre-boot application being designed to operate in real mode, where-in the pre-boot application comprises option-ROM code on an add-in device;
switch the processor to protected mode;
execute the pre-boot application in protected mode;
translate a real mode memory address used by the pre-boot application into an extended memory address reference;
execute a pre-boot application instruction using the translated extended memory address instead of the real mode memory address; and
restore the processor to a state held previous to switching to protected mode, wherein the state held previous is one of real mode and protected mode.

8. The machine accessible medium as recited in claim 7, wherein translating is performed by an interrupt service routine (ISR).

9. A machine accessible storage medium having instructions stored thereon for translating real mode addressing to protected mode addressing, that when executed cause a machine to:
allocate extended memory for data storage to a pre-boot application, the pre-boot application being designed to operate in real mode;
switch the processor to protected mode;

translate a real mode memory address used by the pre-boot application into an extended memory address reference;
execute a pre-boot application instruction using the translated extended memory address instead of the real mode memory address;
create descriptor tables; and
initialize the descriptor tables.

10. The machine accessible medium as recited in claim 9, wherein the descriptor tables comprise at least one global descriptor table (GDT), at least one interrupt descriptor table (IDT), and at least one local descriptor table (LDT).

11. A machine accessible storage medium having instructions stored thereon for translating real mode addressing to protected mode addressing, that when executed cause a machine to:
allocate extended memory for data storage to a pre-boot application, the pre-boot application being designed to operate n real mode;
switch the processor to protected mode;
translate a real mode memory address used by the pre-boot application into an extended memory address reference, wherein translating is performed by an interrupt service routine (ISR);
execute a pre-boot application instruction using the translated extended memory address instead of the real mode memory address;
access memory using real mode segment register;
issue a general protection fault (GPF) if a null descriptor is referenced in a global descriptor table (GDT); and
create a new descriptor in the GDT that points to a location in extended memory.

12. The machine accessible medium as recited in claim 11, having instructions further causing the machine to:
use a local descriptor table (LDT) to translate addresses where flag bits of the segment register are non-zero; and
replace the segment register with a newly created LDT descriptor.

13. A system, comprising:
a processor operatively coupled to a non-volatile memory storing pre-boot instructions;
a system memory operatively coupled to the processor, wherein the system memory comprises a conventional memory block and an upper memory block accessible in both real and protected modes, and an extended memory block accessible only in protected mode; and
an interrupt service routine (ISR) to translate real mode segment addressing to protected mode selector addressing, wherein the ISR is automatically initiated when a pre-boot application attempts to access memory during execution, wherein the pre-boot application comprises an option-ROM for an add-in device.

14. The system as recited in claim 13, wherein the ISR uses descriptor tables during the translation of real mode segment addressing to protected mode selector addressing, and wherein a null descriptor causes a general protection fault to initiate an interrupt handler to generate a descriptor for the segment address which references a physical memory location in extended memory.

15. The system as recited in claim 13, wherein the pre-boot application is a basic input/output system (BIOS).

16. A method, comprising:
allocating extended memory for data storage to a pre-boot application, the pre-boot application being designed to operate in real mode;
switching the processor to protected mode;

executing the pre-boot application in protected mode, wherein the pre-boot application uses real mode memory addresses;
translating a real mode memory address used by the pre-boot application into an extended memory address reference; and
executing a pre-boot application instruction using the translated extended memory address instead of the real mode memory address.

17. The method as recited in claim 16, wherein allocating extended memory further comprises:
creating descriptor tables; and
initializing the descriptor tables.

18. The method as recited in claim 17, wherein the descriptor tables comprise at least one global descriptor table (GDT), at least one interrupt descriptor table (IDT), and at least one local descriptor table (LDT).

19. The method as recited in claim 16, wherein translating is performed by an interrupt service routine (ISR).

20. The method as recited in claim 19, further comprising:
accessing memory using a real mode segment register;
issuing a general protection fault (GPF) if a null descriptor is referenced in a global descriptor table (GDT); and
creating a new descriptor in the (GDT) that points to a location in extended memory.

21. The method as recited in claim 20, further comprising:
using a local descriptor table (LDT) to translate addresses where flag bits of the segment register are non-zero; and
replacing the segment register with a newly created LDT descriptor.

22. A machine accessible storage medium having instructions stored thereon translating real mode addressing to protected mode addressing, that when executed cause a machine to:
allocate extended memory for data storage to a pre-boot application, the pre-boot application being designed to operate in real mode;
switch the processor to protected mode;
execute the pre-boot application in protected mode, wherein the pre-boot application uses real mode memory addresses;
translate a real mode memory address used by the pre-boot application into an extended memory address reference; and
execute a pre-boot application instruction using the translated extended memory address instead of the real mode memory address.

23. The medium as recited in claim 22, wherein allocating extended memory further comprises instructions to:
create descriptor tables; and
initialize the descriptor tables.

24. The medium as recited in claim 23, wherein the descriptor tables comprise at least one global descriptor table (GDT), at least one interrupt descriptor table (IDT), and at least one local descriptor table (LDT).

25. The medium as recited in claim 22, wherein translating is performed by an interrupt service routine (ISR).

26. The medium as recited in claim 25, further comprising instructions to:
access memory using a real mode segment register;
issue a general protection fault (GPF) if a null descriptor is referenced in a global descriptor table (GDT); and
create a new descriptor in the GDT that points to a location in extended memory.

27. The medium as recited in claim 26, further comprising instructions to:
use a local descriptor table (LDT) to translate addresses where flag bits of the segment register are non-zero; and
replace the segment register with a newly created LDT descriptor.

* * * * *